US006778138B2

(12) United States Patent
Purdy et al.

(10) Patent No.: US 6,778,138 B2
(45) Date of Patent: Aug. 17, 2004

(54) APPARATUS FOR AND METHOD OF FORMING MULTIPLE SIMULTANEOUS ELECTRONICALLY SCANNED BEAMS USING DIRECT DIGITAL SYNTHESIS

(75) Inventors: Daniel S. Purdy, Falls Church, VA (US); H. Wade Swinford, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/295,552

(22) Filed: Nov. 14, 2002

(65) Prior Publication Data

US 2003/0095068 A1 May 22, 2003

Related U.S. Application Data

(60) Provisional application No. 60/331,291, filed on Nov. 14, 2001.

(51) Int. Cl.[7] .................................................. G01S 3/00

(52) U.S. Cl. ........................................ 342/377; 342/372

(58) Field of Search .................................. 342/377, 372

(56) References Cited

U.S. PATENT DOCUMENTS 5,541,607 A * 7/1996 Reinhardt .................. 342/372

* cited by examiner

*Primary Examiner*—Theodore M. Blum

(74) *Attorney, Agent, or Firm*—Thomas E. McDonnell; A. David Spevack; John G. Wynn

(57) ABSTRACT

The apparatus/method according to the present invention accomplishes a reduction in the total number of direct digital synthesizers (DDSs) needed for use in electronically scanned antenna array to generate multiple simultaneous radio frequency (RF) beams. The apparatus includes, inter alia, a multi-beam forming synthesizer, a plurality of DDSs, a corresponding plurality of amplifiers all operatively connected to a plurality of radiating elements of the antenna array. This arrangement uses a single DDS per radiating element. Each DDS uses a composite amplitude, phase and frequency information computed by the multi-beam forming synthesizer to create the proper waveform for driving the antenna array, and accordingly, generating the desired multiple simultaneous RF beams, i.e. 1–M (e.g. 1 through M) RF beams each of which can have a different frequency and separate modulation.

6 Claims, 4 Drawing Sheets

APPARATUS FOR AND METHOD OF FORMING MULTIPLE SIMULTANEOUS ELECTRONICALLY SCANNED BEAMS USING DIRECT DIGITAL SYNTHESIS

RELATED APPLICATION

This Patent Application claims the benefit of U.S. Provisional Application Serial No. 60/331,291 filed on Nov. 14, 2001.

BACKGROUND OF THE INVENTION

1. Field of the Invention

The present invention relates to an improved apparatus (hardware arrangement) and algorithm that employs a direct digital radio frequency synthesizer to generate and transmit multiple simultaneous radio frequency (RF) beams, which can be electronically scanned.

2. Description of the Prior Art

In the past, a number of methods and apparatus have been used to generate electronically scanned radio frequency beams using array elements. These methods include both analog beamforming and digital beamforming techniques that are applied to transmit array antennas as discussed in the references [1,2]. By the principal of superposition it is possible to apply same frequency signals to each of N radiating elements so that the summation of same frequency signals at a point in the field of the elements forms a single beam, which can be electronically scanned by introducing a relative timing or phase delay at each of the elements. Those skilled in the art know that for example, the aperture size of an array antenna can be increased by increasing the total number of radiating elements N so that a sufficiently narrow beam width can be achieved so as to direct RF energy in a specified direction with a desired beam width. It is possible to digitally generate RF signals using an apparatus referred to a direct digital synthesizer (DDS) and as described in the references [3,4,8,9] for example. Such DDSs produce RF signals with an output that is determined by digital control signals, which may include clock, amplitude, frequency and phase control signals. Using a DDS it is therefore possible to generate a RF waveform which is defined by the digital control signals.

It is possible, therefore, to use a DDS to generate a digitally formed beam that can be electronically scanned with digital control signals. Prior art methods for digitally forming RF beams using a DDS are disclosed, for example, in references [6,6a,7]. In the prior art, an architecture produces a single RF beam with N element chains, where an element chain consists of at least a DDS, digital control signals, and a radiating antenna element. The digital control architecture, amplitude, phase and frequency are all provided in parallel to each of the elements, thus facilitating a means of controlling modulation of the produced waveform. A clock signal is distributed to DDS circuits in order to establish a timing reference useful in synchronizing multiple DDS circuits. Proper phasing of the RF waveforms provided to each of the radiating elements within the array permits the beam to be electronically scanned to a desired pointing direction. The limitation of the architecture of the prior art is that it produces only a single beam per beamformer and array, using the N elements.

It is often desirable to radiate more than one RF beam, where each beam or set of beams may have a different center frequency and modulation using the same array aperture as disclosed in references [1,2,5,5a]. However, the existing prior art method for generating M multiple simultaneous beams from the same aperture is to use the principle of superposition to sum signals prior to driving the radiating element, so that it requires M beamforming units to combine the signals. As disclosed in references [6,6a,7], one DDS circuit is required for every radiating element in order to produce a single RF beam. Thus, In order to handle M different information signals that are to be formed into M different independent RF beams, M DDS circuits are required per radiating element in the antenna array. The synthesized RF signals for a given radiating element (or subarray) are summed using an RF combining network and applied to the radiating element. The RF signals are radiated and by superposition form the desired RF beams. Therefore, prior art systems, would require N×M total DDS circuits to form M beams having the same beamwidth as the single beam system described above. Thus, there is a need in the prior art to reduce the hardware requirements for a DDS electronically scanned array system that is configured to farm multiple independent beams in an improved manner.

OBJECTS OF THE INVENTION

Accordingly, a principal object of the present invention is to configure an apparatus and create a method that efficiently and optimally produces multiple simultaneous RF beams, i.e., M beams, each of which can have a different frequency and separate modulation, are independently electronically scanned and can be easily defined in software.

A corollary of the above object is to reduce the number of DDS circuits needed from N×M to N, while maintaining the effective aperture size used to generate each of the M independently pointed beams which may contain independent frequency and/or modulation information.

A further object of the present invention is to reduce the need for RF combining circuits in order to generate the multiple simultaneous RF beams.

Another object of the present invention is to generate additional RF beams, which can be used to transmit radar, communications, or other information with a minimal increase in hardware.

Yet still another object of the present invention is to improve the capacity to generate additional RF beams by defining in software the number, frequency, and modulation of the RF beams thereby providing further improvement in system flexibility.

SUMMARY OF THE INVENTION

In accordance with the above stated objects, other objects, features and advantages, the apparatus of the present invention is configured to generate multiple simultaneous RF beams using a minimal number of DDS circuits and related hardware. This increase in the number of RF beams in an antenna array system permits an increase in throughput of radar, communications and other signal information without increasing the DDS circuits necessary, and, accordingly, the number of associated radiating elements in the antenna array system needed.

The essence of the invention is in the use of digital signal processing to combine signals digitally so that the same DDS per radiating element can produce the superposition of multiple waveforms to create the multiple beams. The digital control signals that are applied to each DDS consist of amplitude, phase, and frequency signals, which are parameters that can be defined in software. The apparatus and method of the present invention are improvements over the prior art since they require less circuitry and provide the capacity to reconfigure the number of RF beams without an increase in hardware.

BRIEF DESCRIPTION OF THE DRAWINGS

The previously stated objects, other objects, features and advantages of the present invention will be more apparent from the following more particular description of the preferred embodiments, taken in connection with the accompanying drawings, in which.

BRIEF DESCRIPTION OF THE PREFERRED EMBODIMENTS

Figure 1:
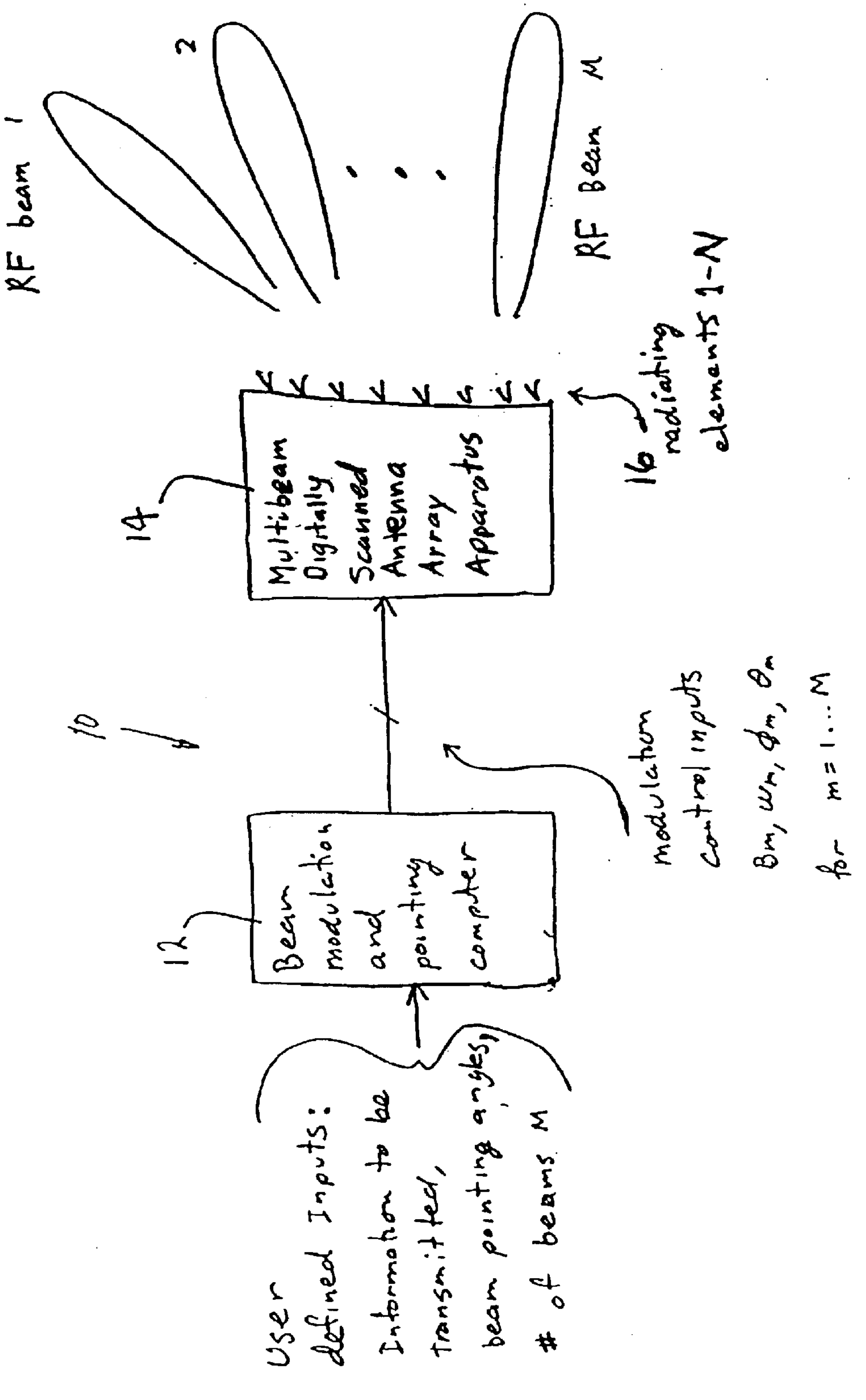
FIG. 1 is a system block diagram that shows user defined information at its input to be transmitted input and the formation of multiple simultaneous RF beams at its output for carrying the information to be transmitted.

FIG. 1 shows a top-level diagram of a multiple simultaneous beam system 10 in accordance with the present invention. A user of the invention defines information content to be transmitted on each of the RF beams 1–M (e.g., 1 through M, where M is the total number of RF beams to be transmitted). This information are time samples selected from the group of frequency, modulation information, digital data, and pointing directions which are processed by a beam modulation and pointing computer 12. The beam modulation and pointing computer 12 converts the information content to be transmitted in the beam to a set of standardized format digital control signals for each of the 1–M beams. For the m-th beam the modulation control signals are written as signal amplitude $B_m$, frequency $\omega_m$, phase $\phi_m$, and beam pointing direction $\theta_m$. The modulation control signals containing amplitude, phase, frequency and pointing information are inputted to the multi-beam digitally scanned array apparatus 14, which is operatively connected to 1–N (e.g., 1 through N, where N is the total number of array radiating elements) radiating elements 16 so as to simultaneously generate the independent scanned RF beams 1–M, aforementioned. At positions located in the field of view for the array radiating elements, the 1-M multiple simultaneous independent beams are formed by superposition of the signals defined by the modulation control signals and generated digitally by use of the direct digital synthesizers internal to the multi-beam digitally scanned array apparatus 14 and described in FIGS. 2, 3 and 4.

Figure 2:
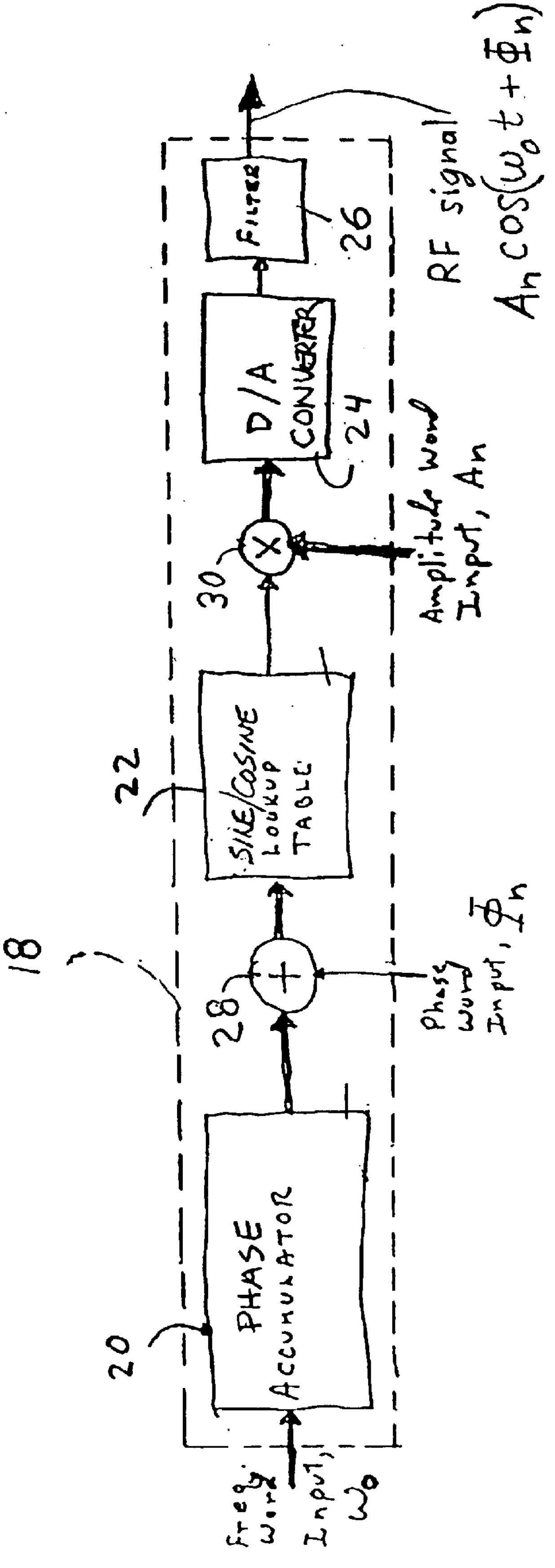
FIG. 2 is a block diagram representation of a direct digital synthesizer (DDS) having digital control signal inputs and RF signal outputs.

FIG. 2 shows a functional block diagram of a Direct Digital Synthesizer (DDS) 18 used in the invention internal to the multi-beam digitally scanned array apparatus 14, which is used to digitally form a modulated RF sinewave signal of the form $A_n(t)\cos[\omega_o(t)t+\Phi_n(t)]$ at its output. The modulation inputs to the DDS 18 are amplitude $A_n(t)$, frequency $\omega_o(t)$, and phase modulation $\Phi_n(t)$, where the parameter t denotes time because the digital control modulation inputs can vary over time. These inputs are in the form of digital words, and the output of the DDS 18 is an analog, sinusoidal voltage of the specified frequency, phase and amplitude as depicted.

Still referring to FIG. 2, those skilled in the art will know that DDS 18 may have an additional clock pulse input signal (not shown) which can be used to provide timing synchronization of a plurality of DDSs 18 so that multiple coherent synchronized signals, which are coherently summed, are produced. For purposes of the present invention, DDS 18 comprises a phase accumulator 20, a sine/cosine lookup table 22, a digital-to-analog (D/A) converter 24, and a filter 26. Fundamentally, the DDS 18 operates by taking the frequency word at its input and accumulating it in the phase accumulator 20. This accumulation forms a phase angle. To this angle is added the phase input to the DDS 18 at an adder 28 to obtain a sum total phase. This composite angle is then inputted to the sine/cosine look up table 22. The output of the sine/cosine look up table 22 is the sine or cosine of the angle, representing samples of an RF sine-wave signal. This value is then amplitude modulated (multiplied) in the multiplier 30 by the amplitude input to the DDS 18, and the resultant digital word is converted to an analog voltage by the D/A converter 24. The output of the D/A converter 24 is then filtered in filter 26 to smooth it and eliminated alias frequencies. This becomes the RF signal output of the DDS 18 which contains amplitude, frequency and phase information relative to a coherent clock or reference signal.

Figure 3:
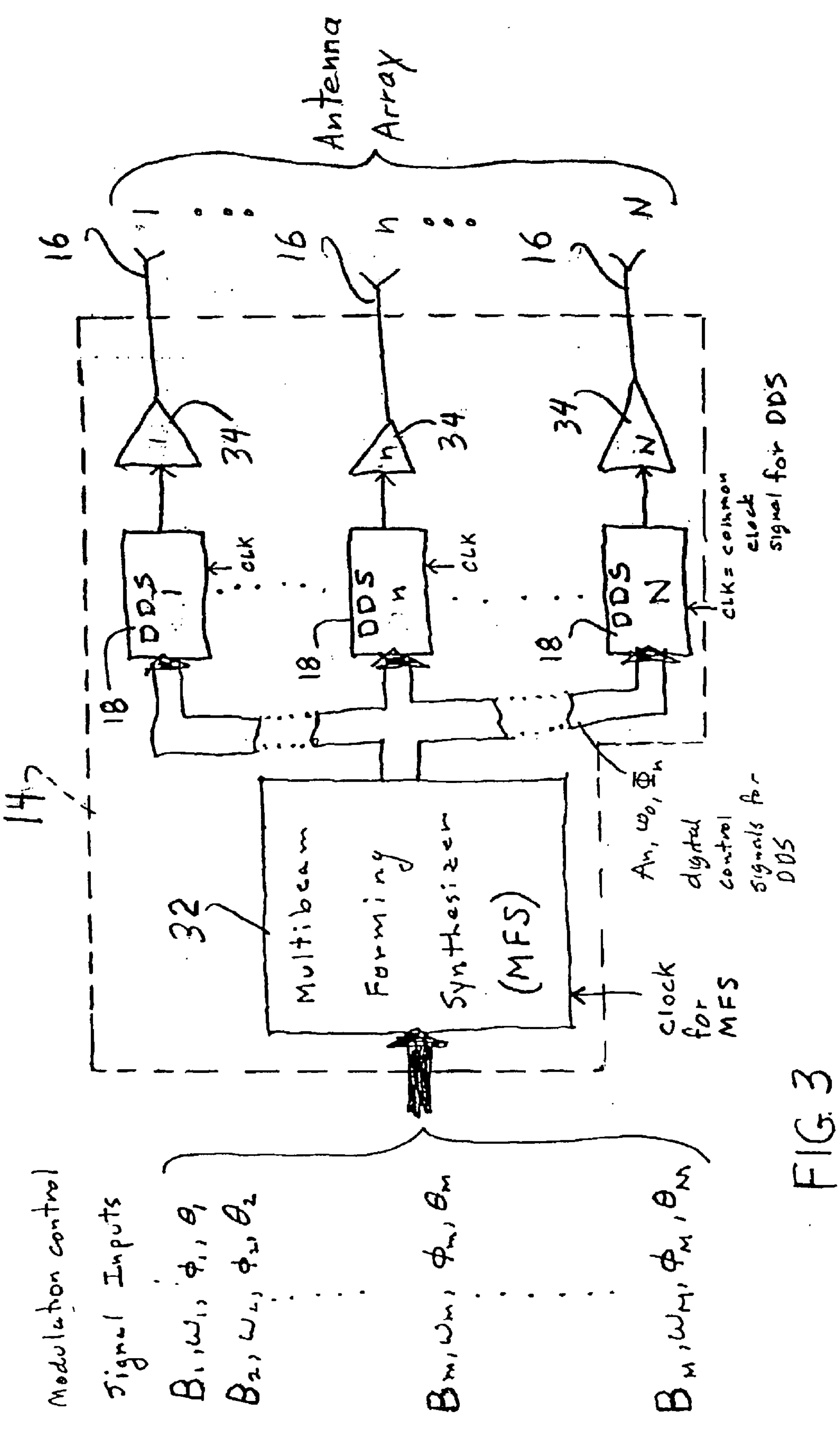
FIG. 3 is a block diagram of the invention showing the signal inputs, frequency, amplitude, phase and pointing angle for each of M beams applied to a multibeam forming synthesizer and the apparatus arrangement connecting the digital control signal to the DDSs of FIG. 2.

FIG. 3 shows, in block diagram form, the multibeam digitally scanned array apparatus 14 for forming multiple simultaneous electronically scanned beams, according to the present invention. The multibeam digitally scanned array apparatus 14 comprises a multibeam forming synthesizer 32, a plurality of DDSs 18, a plurality of amplifiers 34 and a plurality of radiating elements 16. This arrangement uses a single DDS 18 per radiating element 16 to form multiple simultaneous independent beams, which is an important and novel aspect of the present invention. This is realized because of the functionality of the multibeam forming synthesizer 32 as coupled to the DDS for each element in accordance with the architectural layout of invention. The multibeam forming synthesizer 32 inputs are the amplitude, frequency, phase, and beam directions for each of the various signals to be contained in each of the beams. The outputs of the multibeam forming synthesizer 32 are superposition of the modulation control signals and contain the composite of amplitude, phase, and frequency signal that is used to control a single DDS per radiating element to form multiple simultaneous independent RF beams in the field of view of the antenna array. Those quantities can all vary in time, and in fact, the variation in time of the amplitude, frequency, or phase represents the important information in each individual signal. Therefore a clock is provided to the multibeam forming synthesizer 32 in order to provide synchronization and timing that is required to compute the time sampled digital control signals coupled to each 1–N DDSs 18.

Figure 4:
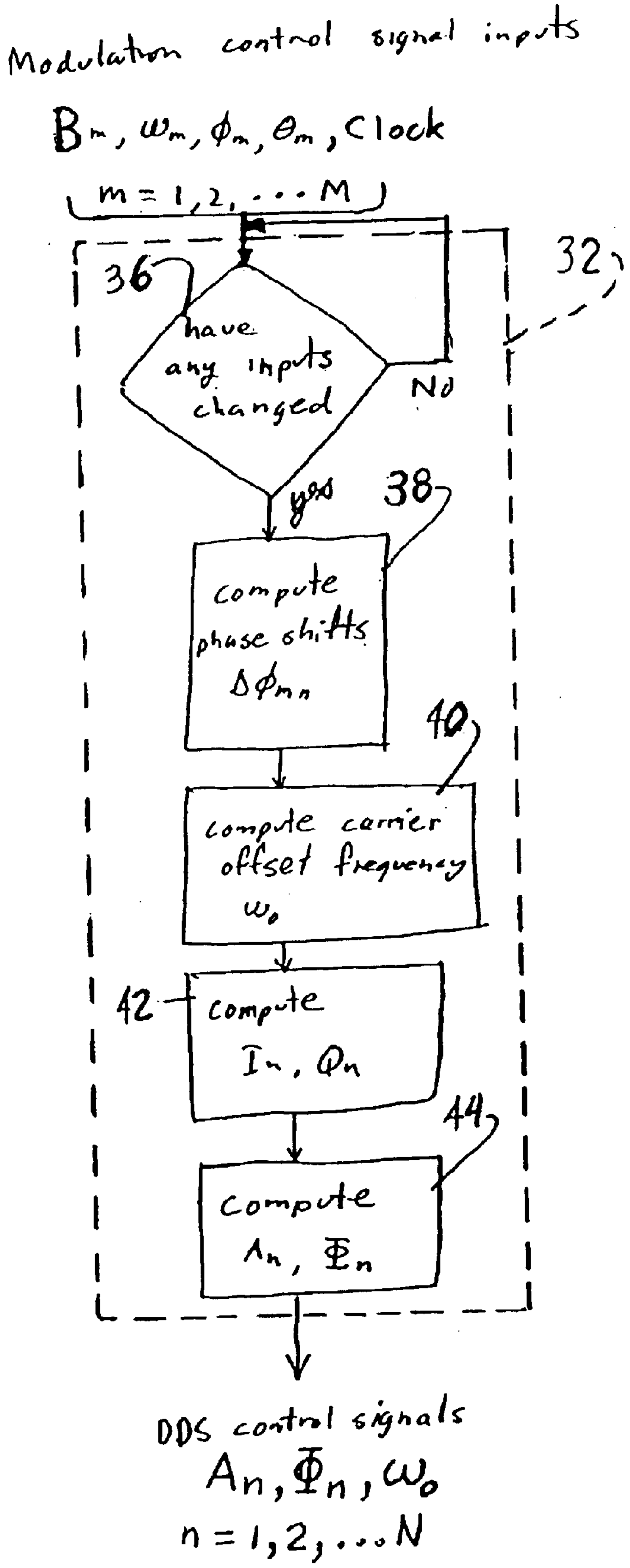
FIG. 4 is a functional flow diagram of the operational blocks of the multibeam forming synthesizer of FIG. 3, showing the computing functions thereof in accordance with the operation of the present invention.
Figure 1:
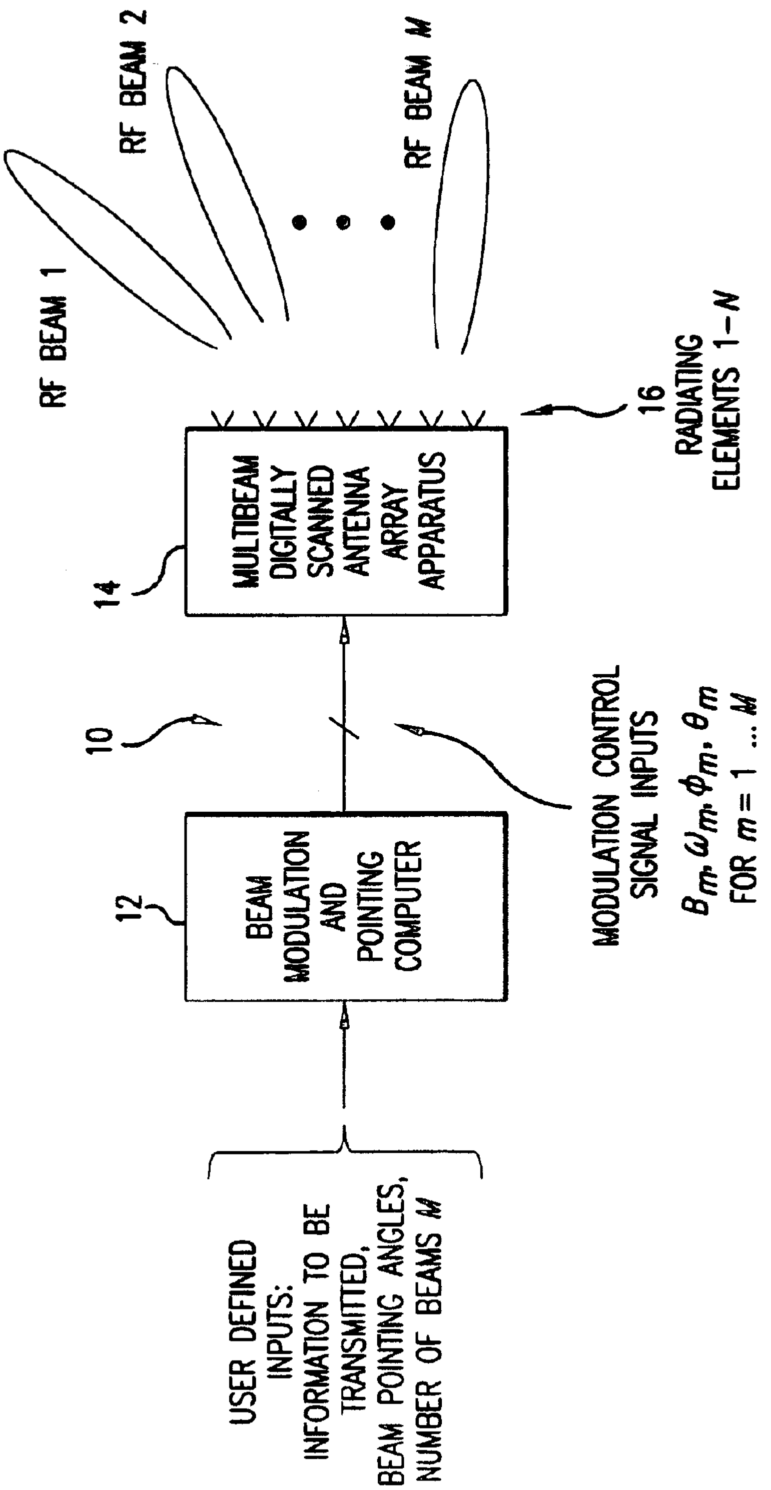
Figure 2:
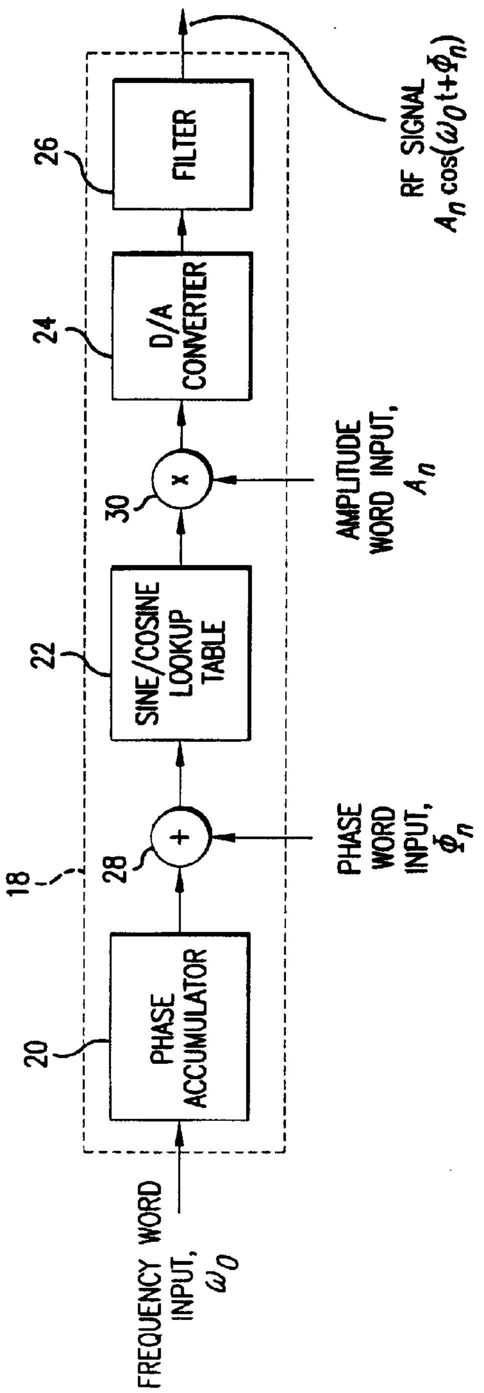
Figure 3:
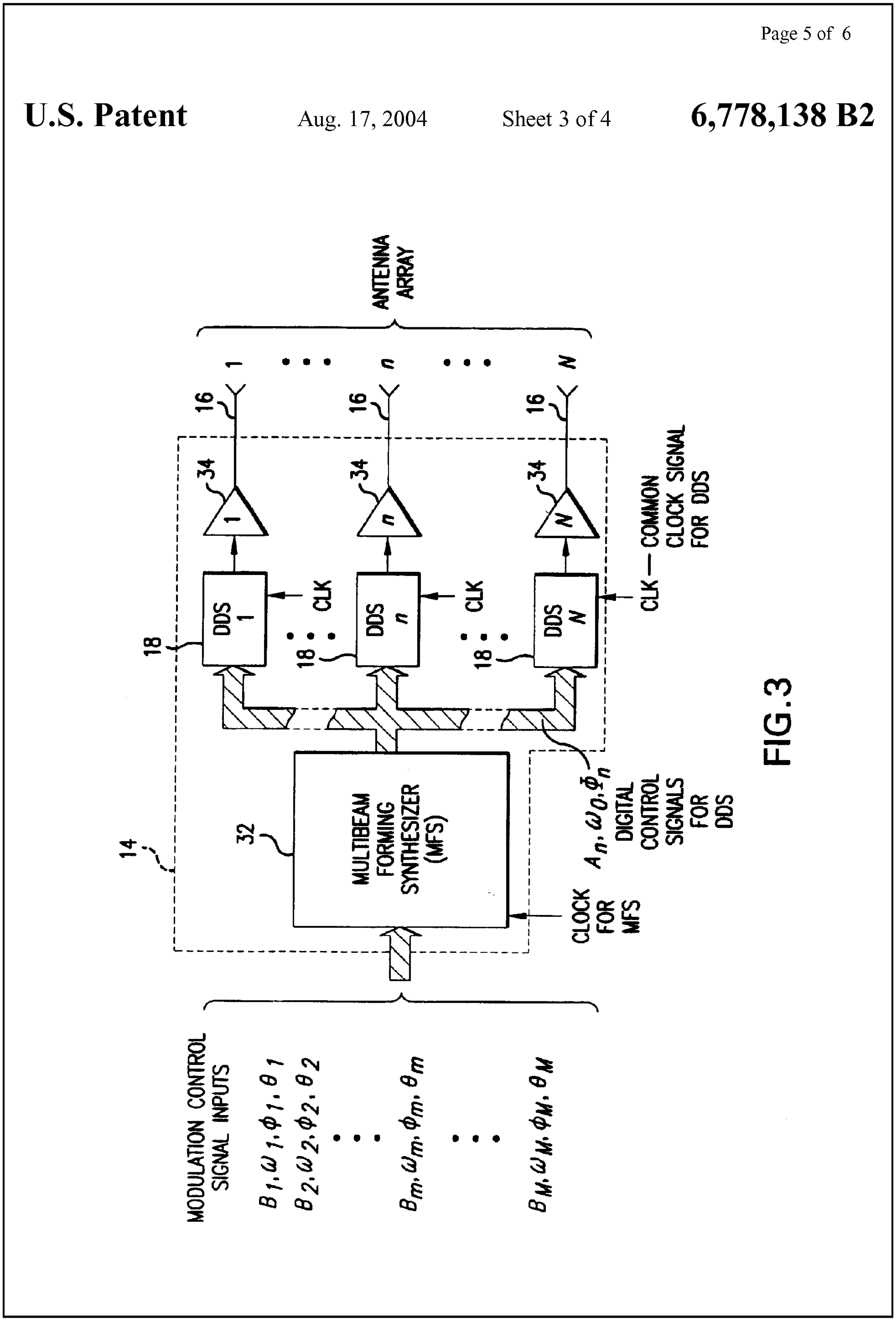
Figure 4:
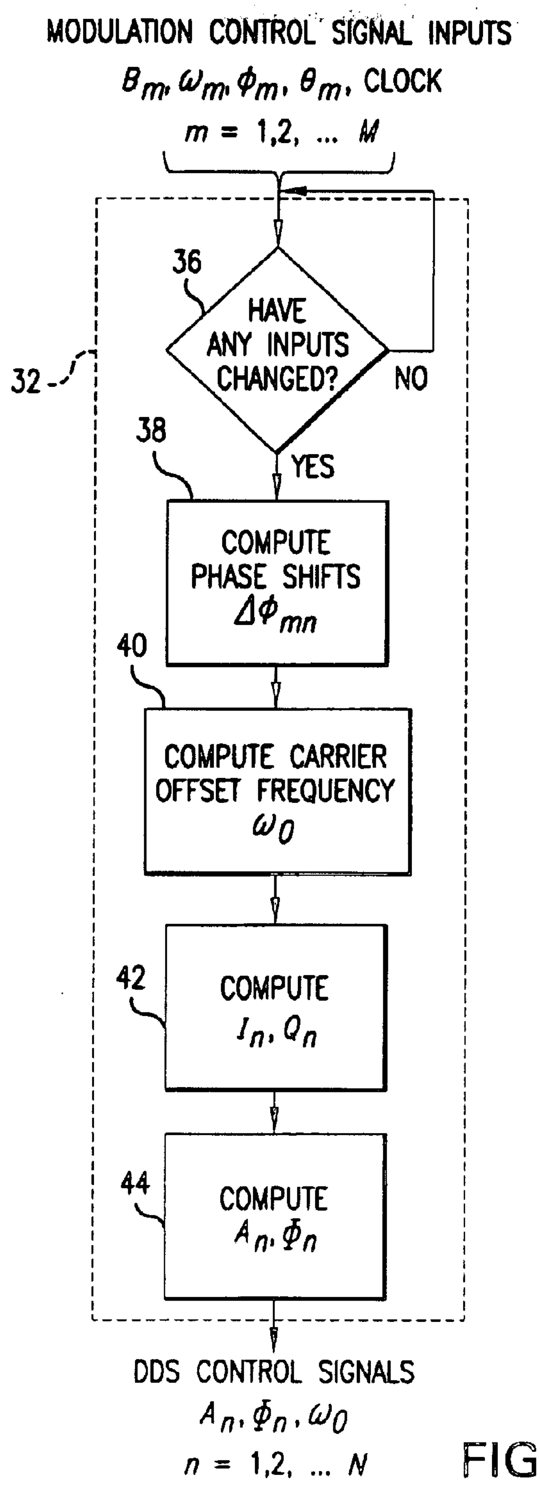

Referring to FIGS. 3 and 4 as viewed concurrently, when modulation control signals are applied to the multibeam forming synthesizer 32 it decides if a new clock signal is present as indicated by decision block 36. If yes, then the multibeam forming synthesizer 32 computes the phase shift for each signal needed for each radiating element 16 to point that signal in the required direction as indicated by processor block 38. Next, the multibeam forming synthesizer 32 computes the carrier offset frequencies for each of those signals as indicated by processor block 40. The in-phase and quadrature components for each signal are then computed as indicated by processor block 42. Finally, the resultant output amplitude and phase for input to each of the DDSs 18 is computed by the multibeam forming synthesizer 32 as indicated by processor block 44. In the implementation of process blocks 38, 40, 42, 44 it is important to note that the multi-beam forming synthesizer 32 computes time sample representation of a baseband (e.g., composite) signal containing the superposition of all information within the M beams, and therefore a minimum sampling rate of at least twice the said information bandwidth (e.g., the Nyquist sampling criterion) is required.

Still referring to FIGS. 3 and 4 as viewed concurrently, and to reiterate, the multibeam forming synthesizer 32 causes the information, i.e., the modulation control signals, at its input to be combined into one signal so that only one DDS 18 per radiating element 16 is required. As shown in FIG. 3, a common clock signal is coupled to each of the DDSs 18 to provide timing for synchronization of the plurality of DDSs 18 and the radiating elements 16 needed to obtain coherent signals necessary for beamforming.

When reviewing the following examples of implementing the invention in hardware and software by algorithmic representation, refer to FIGS. 3 and 4 as viewed concurrently.

EXAMPLE 1

There are a number of ways to implement the digital processing functions of the multibeam forming synthesizer 32 of the present invention. For example, any of the serial or parallel processing methods currently employed in commercially available digital computers would be sufficient. Serial processing computers can perform the processing algorithms sequentially and then distribute the results in serial fashion to each of the 1–N DDSs 18. Parallel processing can be implemented by using a single processor at each one of the 1–N of DDSs 18 to implement the digital calculations for each DDS 16 in parallel. Various configurations that combine both serial and parallel processing can also be implemented. Those skilled in the art recognize that parallel processing provides a processing speed advantage for calculations that can be implemented in parallel (compared to serial processing), thus providing improved and streamlined digital processing.

EXAMPLE 2

Another embodiment for the multibeam forming synthesizer 32 is to implement the digital processing functions in re-configurable logic, such as, for example, a field programmable gate array (FPGA). Such FPGAs can perform software programmable executions of hardware logic, and therefore can be reconfigured to optimize the processing algorithm, based on, for example, the number of beams, type of modulations etc. Such an embodiment provides added flexibility in the capacity of the present invention to be programmed in software.

Following each DDS 16 is an amplifier 34 having a bandwidth suitable to amplify and pass the RF signal generated by the DDS 16. Those skilled in the art are aware that the use of the amplifier 34 and bandpass filters 24 of FIG. 2 is optional and dependent upon the desired amount of energy and spectral purity of the signal to be radiated by the antenna array.

EXAMPLE 3

The carrier offset frequency, $\omega_o$, is computed by the multi-beam forming synthesizer 32 for 1–M beams and can be chosen in many different ways. For example, it could be selected as the mean of the input signal frequencies given by the equation $$\omega_o = \frac{1}{M}\sum_{m=1}^{M}\omega_m. \tag{1}$$

For those skilled in the art it is obvious that $\omega_o$ could be selected, for example, at the lower or upper frequency band edges of the composite signal to be formed by the DDS 16. In fact, the only practical restriction on $\omega_o$ is that it must be selected so that it is a valid frequency control word over the usable frequency of operation for the DDS 18.

EXAMPLE 4

The RF signal output from the amplifier 34 is coupled to a radiating element 16. For purposes of the present invention, the radiating element 16 is usually an individual antenna element consisting of, for example, patches, spirals, slots, dipoles or horn type antennas. Two or more radiating elements 16 can be used to form a beam that may be electronically scanned. The criteria for radiating element 16 is that it normally provides a radiation pattern, or main lobe which covers the extent of the field of view scanning range for the array.

EXAMPLE 5

The computation of phase shifts for steering of RF beams is shown below. The beams are electronically scanned by selecting a phase shift $\Delta\phi_{mn}$ for each corresponding n-th element and the m-th beam in order to provide a phase tilt in the energy radiated from the radiating elements 16. For example, a linear array could accomplish beam steering by applying a linear phase tilt given by $$\Delta\phi_{mn} = \frac{d\omega_m}{c}(n-1)\sin\theta_m \tag{2}$$

where d is the spacing between elements, c is the velocity of light ($c \approx 3\times10^8$ meters per second), and $\theta_m$ is the pointing angle for the m-th beam relative to the perpendicular of the linear array. For those skilled in the art, it is obvious that one can utilize techniques for positioning arrays of radiating elements 16, for example, in a planar, circular or conformal displacement of radiating elements 16, at which a different equation than above would be used to compute phase shifts needed for electronically scanning the beam.

EXAMPLE 6

Consider 1–M beams operating at different frequencies and with differing amplitudes and phases as aforementioned. At the n-th one of the radiating element 16 the composite signal is the superposition of signals for each beam given by $s_{1n}+s_{2n}+\ldots+s_{Mn}$, where each of the signals for each beam are defined as:

$$\text{RF beam 1 is of the form } s_{1n}=B_1\sin[\omega_1 t+\phi_1+\Delta\phi_{1n}] \tag{3a}$$

$$\text{RF beam 2 is of the form } s_{2n}=B_2\sin[\omega_2 t+\phi_2+\Delta\phi_{2n}] \tag{3b}$$

•
•
•

$$\text{RF beam M is of the form } s_{Mn}=B_M\sin[\omega_M t+\phi_M+\Delta\phi_{Mn}] \tag{3c}$$

In this embodiment the superposition of each of the RF beam signals is placed in the standardized form of $A_n(t)\cos[\omega_o(t)t+\Phi_n(t)]$ by using the following in-phase $I_n$ and quadrature $Q_n$ definitions of the signals to be radiated by the n-th radiating element 16. The amplitude control coupled to the n-th radiating element is given by:

$$A_n=(I_n^2+Q_n^2)^{1/2} \tag{4}$$

Where $$I_n=\sum_{m=1}^{M}B_m\cos[(\omega_m-\omega_o)t+\phi_m+\Delta\phi_{mn}]$$

$$Q_n=\sum_{m=1}^{M}B_m\sin[(\omega_m-\omega_o)t+\phi_m+\Delta\phi_{mn}]$$

The phase control coupled to the n-th radiating element 16 as computed by the multibeam forming synthesizer 32 is given by the following $$\Phi_n=arctan(Q_n/I_n) \tag{5}$$

With the control signals $A_n$, $\Phi_n$ and $\omega_o$ applied to control the n-th DDSs 18 the signal coupled to the n-th radiating element 16 becomes: $A_n(t)\cos[\omega_o(t)t+\Phi_n(t)]$. The RF signal generated by the 1–N DDSs 18 and radiated by the 1–N radiating element 16 which form the antenna array and provides multiple independent simultaneous beams as in FIG. 1. Each of the 1–M RF beams shown in FIG. 1 have an RF signal with modulation and pointing direction as defined by specified amplitude, phase, frequency and pointing direction as given in equations (1) through (5).

EXAMPLE 7

Those skilled in the art are aware that electronically scanned array systems can employ multiple clock and timing distribution subsystems. Timing and synchronization are important considerations for the generation and distribution of control and RF signals required to produce coherent signals at radiating elements 16 in order to form the multiple simultaneous RF beams as depicted in FIG. 1. The multiple simultaneous beam system 10 as reduced to practice likewise employs a master clock (or timing signal) to provide synchronization and timing control for the beam modulation and pointing computer 12, the multibeam digitally scanned antenna array apparatus 14, and components therein. The clock signal or a multiple thereof for example as shown in FIG. 3 is coupled to each of the 1–N DDS 18 and to the multibeam forming synthesizer 32 so as to provide coherent synchronization for each of the RF signals generated by the DDS 18 and coupled to the radiating element 16. Those skilled in the art are aware that the timing and synchronization clock frequency for the DDS 18 must satisfy a time sampling rate referred to as the Nyquist Criterion which would normally be at least twice the RF frequency output of the 1–N DDS 18. Similarly a clock is required by the multi-beam forming synthesizer 32 that is at least twice the bandwidth of the information contained in the RF beams. Therefore the multi-beam forming synthesizer 32 performs iterations at a frequency that is at least twice the bandwidth of the information to be generated by the composite control signals coupled to the DDSs 18, and therefore requires a clock signal therein of. For the purposes of this invention range of RF frequencies would include microwave frequencies which are generally between 1–40 GHz. Also, for the purposes of this invention the bandwidth of signal to be generated by the 1–M RF beams range from 10 MHz to about 4 GHz as dependent on the rate the DDS can accept digital control signals for modulation.

To those skilled in the art, many modifications and variations of the present invention are possible in light of the above teachings. It is therefore to be under stood that the present invention can be practiced otherwise than as specifically described herein and still be within the spirit and scope of the appended claims.

REFERENCES

[1] R. J. Mailloux, Phased Array Antenna Handbook, Artech House 1994.

[2] H. Steyskal, "Digital Beamforming at Rome Laboratory", pp. 100-126, Microwave Journal, February 1996.

[3] J. Matsui, et al., "InP DHBT Ultra High Speed Direct Digital Synthesizer", GOMAC-2001, March, 2001, San Antonio, Tex.

[4] K. R. Elliot, "High speed HBT Circuitry for Digital Signal Synthesis in Digital Beam Forming Applications", GOMAC-2001, March, 2001, San Antonio, Tex.

[5] Erik Lier, Dan Purdy, "Techniques to Maximize Traffic Capacity in Multi-beam Satellite Active Phased Array Antennas for Nonuniform Traffic Model", IEEE Phase Array Systems and Technology Conference, May 2000, Dana Pt. Calif.

[Sa] E. Lier, A. Jacomb-Hood "Multibeam Active Phased Arrays for Communications Satelites" IEEE Microwave Magazine, December 2000, pages 40-47.

[6] U.S. Pat. No. 5,943,010, Rudish, et al., Aug. 24, 1999, Direct Digital Synthesizer Driven Phased Array Antenna.

[6a] U.S. Pat. No. 5,764,187 Rudish, et al. Jun. 9, 1998, Direct Digital Synthesizer Driven Phased Array Antenna.

[7] U.S. Pat. No. 6,081,226 Caldwell, et al. Jun. 27, 2000, Multi-mode Radar Exciter.

[8] U.S. Pat. No. 6,094,101 Sander, et al. Jul. 25, 2000, Direct Digital Frequency synthesis enabling spur elimination.

[9] U.S. Pat. No. 6,078,629 Critchlow, et al. Jun. 20, 2000, Digital Synthesizer

What is claimed is:

1. A multiple simultaneous beam system comprising:

a beam modulation and pointing computer having an input and an output, user defined modulation control signals for controlling each of 1–M RF beams being operatively connected to the input of said beam modulation and pointing computer, said beam modulation and pointing computer operating to convert the user defined user defined modulation control signals to a set of digital control signals for controlling the 1–M RF beams; and a multibeam digitally scanned antenna array apparatus operatively connected at its input to the output of said beam modulation and pointing computer and operatively connected at its output to 1–N radiating elements comprising an antenna array so as to simultaneously generate corresponding ones of said 1–M RF beams each of which can have a different frequency and separate modulation.

2. The multiple simultaneous beam system of claim 1, wherein said multibeam digitally scanned antenna array apparatus comprises:

a multibeam forming synthesizer having an input and an output, said set of digital control signals from said beam modulation and pointing computer being operatively connected to the input of said multibeam forming synthesizer; and 1–N direct digital synthesizers each being operatively connected at its input to the output of said multibeam forming synthesizer, and each being connected at its output to corresponding ones of said 1–N radiating elements, such that a single one of said 1–N direct digital synthesizers drives a single one of said 1–N radiating elements to simultaneously generate said corresponding ones of said 1–M RF beams, thereby reducing the number of direct digital synthesizers needed to transmit said information to be transmitted on each of said 1–M RF beams.

3. The multiple simultaneous beam system of claim 1, wherein said multibeam digitally scanned antenna array apparatus further comprises 1–N amplifiers each being operatively connected at its input to the output of corresponding ones of said 1–N direct-digital synthesizers, and each of said 1–N amplifiers being operatively connected at its output to corresponding ones of said 1–N radiating elements.

4. The multibeam digitally scanned antenna array apparatus of claim 2, wherein each one of said 1–N direct digital synthesizers comprises:

a phase accumulator having an input and an output, the input of said phase accumulator being operatively connected to the output of said multibeam forming synthesizer;

an adder operatively connected at one of its inputs to the output of said phase accumulator and operatively connected at another of its inputs to the output of said multibeam forming synthesizer;

a sine/cosine lookup table having an input and an output, the input of said sine/cosine lockup table being operatively connected to the output of said adder;

a multiplier operatively connected at one of its inputs to the output of said sine/cosine look up table and operatively connected at another of its inputs to the output of said multibeam forming synthesizer;

a digital-to-analog converter having an input and an output, the input of said digital-to-analog converter being operatively connected to the output of said multiplier; and a filter having its input operatively connected to the output of said digital-to-analog converter and its output operatively connected to said corresponding one of said 1–N radiating elements.

5. The multiple simultaneous beam system of claim 1, wherein said user defined modulation control signals are time samples selected from the group consisting of frequency, modulation information, digital data and pointing directs.

6. The multiple simultaneous beam system of claim 5, wherein said beam modulation and pointing computer converts said user defined modulation control signals for each of the 1–M RF beams, and wherein for the m-th RF beam said modulation control signals are defined as amplitude, $B_m$, frequency, $\omega_m$, phase, $\phi_m$ and beam pointing, $\theta_m$.

* * * * *

UNITED STATES PATENT AND TRADEMARK OFFICE

CERTIFICATE OF CORRECTION

PATENT NO. : 6,778,138 B2
APPLICATION NO. : 10/295552
DATED : August 17, 2004
INVENTOR(S) : Daniel S. Purdy et al.

It is certified that error appears in the above-identified patent and that said Letters Patent is hereby corrected as shown below:

The title page, showing an illustrative figure, should be deleted and substitute therefor the attached title page

IN THE DRAWINGS

The drawings sheets consisting of Figs. 1-4 should be deleted and substitute therefore the attached drawing sheets consisting of Figures 1-4.

Signed and Sealed this

Eighth Day of August, 2006

JON W. DUDAS
*Director of the United States Patent and Trademark Office*

(12) United States Patent
Purdy et al.

(10) Patent No.: US 6,778,138 B2
(45) Date of Patent: Aug. 17, 2004

(54) APPARATUS FOR AND METHOD OF FORMING MULTIPLE SIMULTANEOUS ELECTRONICALLY SCANNED BEAMS USING DIRECT DIGITAL SYNTHESIS

(75) Inventors: Daniel S. Purdy, Falls Church, VA (US); H. Wade Swinford, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/295,552

(22) Filed: Nov. 14, 2002

(65) Prior Publication Data

US 2003/0095068 A1 May 22, 2003

Related U.S. Application Data

(60) Provisional application No. 60/331,291, filed on Nov. 14, 2001.

(51) Int. Cl.[7] .................................................. G01S 3/00
(52) U.S. Cl. ........................................ 342/377; 342/372
(58) Field of Search ................................. 342/377, 372

(56) References Cited

U.S. PATENT DOCUMENTS 5,541,607 A * 7/1996 Reinhardt .................. 342/372

* cited by examiner

*Primary Examiner*—Theodore M. Blum
(74) *Attorney, Agent, or Firm*—Thomas E. McDonnell; A. David Spevack; John G. Wynn

(57) ABSTRACT

The apparatus/method according to the present invention accomplishes a reduction in the total number of direct digital synthesizers (DDSs) needed for use in electronically scanned antenna array to generate multiple simultaneous radio frequency (RF) beams. The apparatus includes, inter alia, a multi-beam forming synthesizer, a plurality of DDSs, a corresponding plurality of amplifiers all operatively connected to a plurality of radiating elements of the antenna array. This arrangement uses a single DDS per radiating element. Each DDS uses a composite amplitude, phase and frequency information computed by the multi-beam forming synthesizer to create the proper waveform for driving the antenna array, and accordingly, generating the desired multiple simultaneous RF beams, i.e. 1–M (e.g. 1 through M) RF beams each of which can have a different frequency and separate modulation.

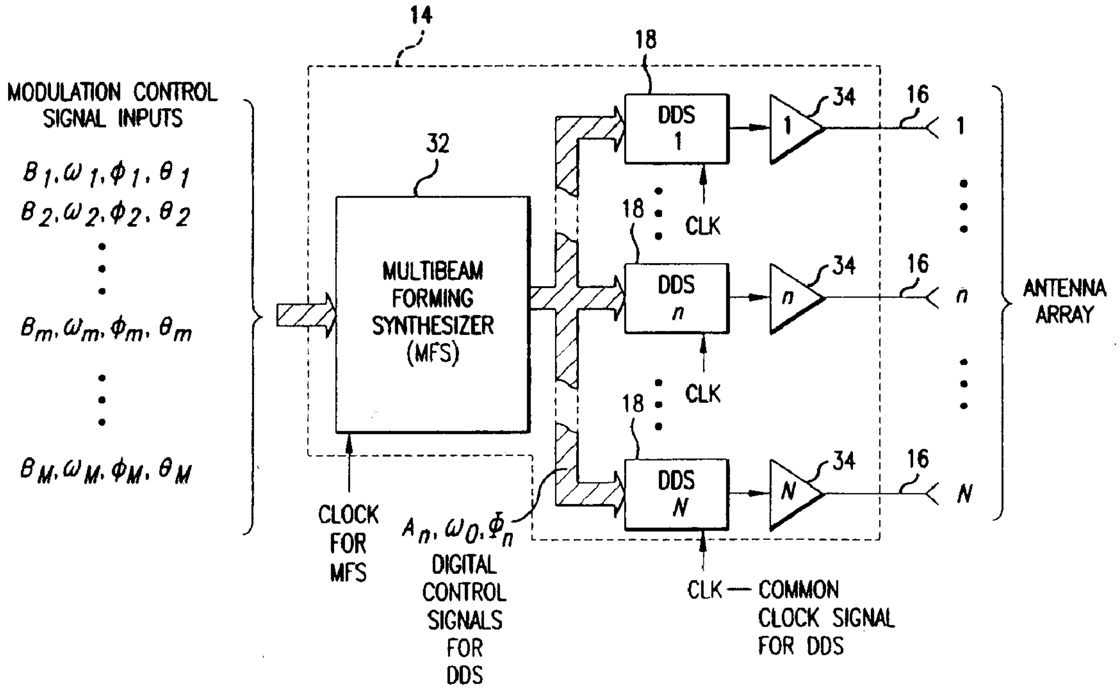

6 Claims, 4 Drawing Sheets